United States Patent
Pudipeddi et al.

(10) Patent No.: US 10,585,868 B2
(45) Date of Patent: *Mar. 10, 2020

(54) EXTENDING CLUSTER ALLOCATIONS IN AN EXTENSIBLE FILE SYSTEM

(71) Applicant: Microsoft Technology Licensing, LLC, Redmond, WA (US)

(72) Inventors: Ravisankar V Pudipeddi, Bellevue, WA (US); Vishal V Ghotge, Seattle, WA (US); Sarosh C. Havewala, Redmond, WA (US); Ravinder S. Thind, Sammamish, WA (US); Mark J. Zbikowski, Bellevue, WA (US); David A. Goebel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 15/380,341

(22) Filed: Dec. 15, 2016

(65) Prior Publication Data
US 2017/0322961 A1    Nov. 9, 2017

Related U.S. Application Data

(60) Continuation of application No. 14/815,076, filed on Jul. 31, 2015, now Pat. No. 9,558,223, which is a
(Continued)

(51) Int. Cl.
G06F 17/30     (2006.01)
G06F 16/22     (2019.01)
(Continued)

(52) U.S. Cl.
CPC ........ *G06F 16/2237* (2019.01); *G06F 3/0607* (2013.01); *G06F 3/067* (2013.01);
(Continued)

(58) Field of Classification Search
USPC ........ 707/607, 609, 687, 705, 790, 813, 821
See application file for complete search history.

(56) References Cited

U.S. PATENT DOCUMENTS 4,780,821 A    10/1988 Crossley
4,987,531 A    1/1991 Nishikado et al.
(Continued)

FOREIGN PATENT DOCUMENTS

AU    20050229678 A1    7/2006
CN    1477518 A    2/2004
(Continued)

OTHER PUBLICATIONS

U.S. Appl. No. 15/397,093; Non-Final Office Action; dated Aug. 11, 2017; 15 pages.
(Continued)

*Primary Examiner* — Sana A Al-Hashemi
(74) *Attorney, Agent, or Firm* — BakerHostetler

(57) ABSTRACT

An extensible file system format for portable storage media is provided. The extensible file system format includes the specification of primary and secondary directory entry types that may be custom defined. The primary and secondary directory entry types can be further classified as critical and benign directory entries. The directory entry types can define whether a cluster chain corresponding to a file can be contiguously allocated.

12 Claims, 8 Drawing Sheets

Related U.S. Application Data continuation of application No. 14/456,419, filed on Aug. 11, 2014, now Pat. No. 9,122,695, which is a continuation of application No. 13/901,997, filed on May 24, 2013, now Pat. No. 8,805,780, which is a continuation of application No. 13/006,063, filed on Jan. 13, 2011, now Pat. No. 8,452,729, which is a division of application No. 11/752,872, filed on May 23, 2007, now Pat. No. 7,873,596.

(60) Provisional application No. 60/802,922, filed on May 23, 2006.

(51) Int. Cl.
  *G06F 16/11* (2019.01)
  *G06F 16/18* (2019.01)
  *G06F 16/27* (2019.01)
  *G06F 16/28* (2019.01)
  *G06F 16/17* (2019.01)
  *G06F 3/06* (2006.01)

(52) U.S. Cl.
  CPC ............ *G06F 3/0643* (2013.01); *G06F 16/11* (2019.01); *G06F 16/1727* (2019.01); *G06F 16/18* (2019.01); *G06F 16/1847* (2019.01); *G06F 16/2291* (2019.01); *G06F 16/275* (2019.01); *G06F 16/285* (2019.01)

(56) References Cited

U.S. PATENT DOCUMENTS

| | | | |
|---|---|---|---|
| 5,083,264 A | 1/1992 | Platteter et al. |
| 5,086,502 A | 2/1992 | Malcolm |
| 5,201,044 A | 4/1993 | Frey et al. |
| 5,202,982 A | 4/1993 | Gramlich et al. |
| 5,297,148 A | 3/1994 | Harari et al. |
| 5,307,494 A | 4/1994 | Yasumatsu et al. |
| 5,313,646 A | 5/1994 | Hendricks et al. |
| 5,359,725 A | 10/1994 | Garcia et al. |
| 5,363,487 A | 11/1994 | Willman et al. |
| 5,367,671 A | 11/1994 | Feigenbaum et al. |
| 5,371,885 A | 12/1994 | Letwin |
| 5,388,257 A | 2/1995 | Bauer |
| 5,392,427 A | 2/1995 | Barrett et al. |
| 5,412,808 A | 5/1995 | Bauer |
| 5,421,001 A | 5/1995 | Methe |
| 5,434,974 A | 7/1995 | Loucks et al. |
| 5,437,029 A | 7/1995 | Sinha |
| 5,469,562 A | 11/1995 | Saether |
| 5,483,652 A | 1/1996 | Sudama et al. |
| 5,535,375 A | 7/1996 | Eshel et al. |
| 5,537,636 A | 7/1996 | Uchida et al. |
| 5,546,389 A | 8/1996 | Wippenbeck et al. |
| 5,574,907 A | 11/1996 | Jernigan et al. |
| 5,579,517 A | 11/1996 | Reynolds et al. |
| 5,596,755 A | 1/1997 | Pletcher et al. |
| 5,627,996 A | 5/1997 | Bauer |
| 5,694,606 A | 12/1997 | Pletcher et al. |
| 5,699,548 A | 12/1997 | Choudhury et al. |
| 5,732,268 A | 3/1998 | Bizzarri |
| 5,734,340 A | 3/1998 | Kennedy |
| 5,745,752 A | 4/1998 | Hurvig et al. |
| 5,745,902 A | 4/1998 | Miller et al. |
| 5,754,848 A | 5/1998 | Hanes |
| 5,758,352 A | 5/1998 | Reynolds et al. |
| 5,761,675 A | 6/1998 | Isenberg |
| 5,761,677 A | 6/1998 | Senator et al. |
| 5,765,169 A | 6/1998 | Conner |
| 5,778,168 A | 7/1998 | Fuller |
| 5,813,011 A | 9/1998 | Yoshida et al. |
| 5,819,275 A | 10/1998 | Badger et al. |
| 5,825,734 A | 10/1998 | Igarashi et al. |
| 5,832,515 A | 11/1998 | Ledain et al. |
| 5,850,506 A | 12/1998 | Gordons |
| 5,898,868 A | 4/1999 | Krueger et al. |
| 5,907,672 A | 5/1999 | Matze et al. |
| 5,923,884 A | 7/1999 | Peyret et al. |
| 5,926,805 A | 7/1999 | Hurvig et al. |
| 5,930,828 A | 7/1999 | Jensen et al. |
| 5,968,127 A | 10/1999 | Kawabe et al. |
| 5,983,240 A | 11/1999 | Shoroff et al. |
| 6,023,744 A | 2/2000 | Shoroff et al. |
| 6,032,223 A | 2/2000 | Beelitz |
| 6,037,738 A | 3/2000 | Morita et al. |
| 6,038,636 A | 3/2000 | Brown et al. |
| 6,049,807 A | 4/2000 | Carroll et al. |
| 6,055,527 A | 4/2000 | Badger et al. |
| 6,078,999 A | 6/2000 | Raju et al. |
| 6,081,804 A | 6/2000 | Smith |
| 6,108,759 A | 8/2000 | Orcutt et al. |
| 6,144,969 A | 11/2000 | Inokuchi et al. |
| 6,192,432 B1 | 2/2001 | Slivka et al. |
| 6,205,558 B1 | 3/2001 | Sobel |
| 6,253,300 B1 | 6/2001 | Lawrence et al. |
| 6,286,013 B1 | 9/2001 | Reynolds et al. |
| 6,286,113 B1 | 9/2001 | Sembach et al. |
| 6,374,265 B1 | 4/2002 | Chen et al. |
| 6,374,268 B1 | 4/2002 | Testardi |
| 6,377,958 B1 | 4/2002 | Orcutt |
| 6,378,031 B1 | 4/2002 | Kuno et al. |
| 6,470,345 B1 | 10/2002 | Doutre et al. |
| 6,510,552 B1 | 1/2003 | Benayoun et al. |
| 6,529,966 B1 | 3/2003 | Willman et al. |
| 6,571,259 B1 | 5/2003 | Zheng et al. |
| 6,594,725 B2 | 7/2003 | Ando et al. |
| 6,611,907 B1 | 8/2003 | Maeda et al. |
| 6,612,490 B1 | 9/2003 | Herrendoerfer et al. |
| 6,615,365 B1 | 9/2003 | Jenevein et al. |
| 6,615,404 B1 | 9/2003 | Garfunkel et al. |
| 6,654,772 B1 | 11/2003 | Crow et al. |
| 6,658,437 B1 | 12/2003 | Lehman |
| 6,662,309 B2 | 12/2003 | Ando et al. |
| 6,675,180 B2 | 1/2004 | Yamashita |
| 6,792,518 B2 | 9/2004 | Armangau et al. |
| 6,856,993 B1 | 2/2005 | Verma et al. |
| 6,883,114 B2 | 4/2005 | Lasser |
| 6,907,184 B1 | 6/2005 | Yokota et al. |
| 6,922,708 B1 | 7/2005 | Sedlar |
| 7,032,107 B2 | 4/2006 | Stutton et al. |
| 7,051,251 B2 | 5/2006 | Moore et al. |
| 7,062,602 B1 | 6/2006 | Moore et al. |
| 7,072,917 B2 | 7/2006 | Wong et al. |
| 7,089,448 B2 | 8/2006 | Hinshaw et al. |
| 7,092,870 B1 | 8/2006 | Chen et al. |
| 7,174,420 B2 | 2/2007 | Malueg et al. |
| 7,274,857 B2 | 9/2007 | Nallur et al. |
| 7,363,540 B2 | 4/2008 | Patel et al. |
| 7,380,140 B1 * | 5/2008 | Weissman ............ G06F 21/575 709/213 |
| 7,380,157 B2 | 5/2008 | Brewer et al. |
| 7,383,288 B2 | 6/2008 | Miloushev et al. |
| 7,493,445 B2 | 2/2009 | Harada |
| 7,613,738 B2 | 11/2009 | Patel et al. |
| 7,620,620 B1 | 11/2009 | Sedlar |
| 7,676,491 B2 | 3/2010 | Jansen et al. |
| 7,685,171 B1 | 3/2010 | Beaverson et al. |
| 7,747,664 B2 | 6/2010 | Patel et al. |
| 7,757,100 B2 | 7/2010 | Weissman et al. |
| 7,873,596 B2 | 1/2011 | Pudipeddi et al. |
| 7,941,435 B2 | 5/2011 | Kao et al. |
| 7,979,409 B2 | 7/2011 | Kime |
| 8,001,165 B2 | 8/2011 | Patel et al. |
| 8,024,383 B2 | 9/2011 | Patel et al. |
| 8,024,507 B2 | 9/2011 | Patel et al. |
| 8,156,165 B2 | 4/2012 | Malueg et al. |
| 8,321,439 B2 | 11/2012 | Pudipeddi et al. |
| 8,352,697 B2 | 1/2013 | Lasser |
| 8,364,732 B2 | 1/2013 | Pudipeddi et al. |
| 8,433,677 B2 | 4/2013 | Pudipeddi et al. |
| 8,452,729 B2 | 5/2013 | Pudipeddi et al. |
| 8,583,708 B2 | 11/2013 | Pudipeddi et al. |
| 8,606,830 B2 | 12/2013 | Pudipeddi et al. |

(56) References Cited

U.S. PATENT DOCUMENTS

| | | | |
|---|---|---|---|
| 8,725,772 | B2 | 5/2014 | Pudipeddi et al. |
| 2001/0016841 | A1 | 8/2001 | Karasudani |
| 2001/0054129 | A1 | 12/2001 | Wouters |
| 2002/0040361 | A1 | 4/2002 | Tikkanen et al. |
| 2002/0042796 | A1 | 4/2002 | Igakura |
| 2002/0062301 | A1 | 5/2002 | Rudoff et al. |
| 2002/0116406 | A1 | 8/2002 | Goldick |
| 2002/0152354 | A1 | 10/2002 | Harmer |
| 2003/0028765 | A1 | 2/2003 | Cromer et al. |
| 2003/0088587 | A1 | 5/2003 | Merrells et al. |
| 2003/0105781 | A1 | 6/2003 | Morris |
| 2003/0135650 | A1 | 7/2003 | Kano et al. |
| 2003/0163802 | A1 | 8/2003 | Takahashi |
| 2003/0177107 | A1 | 9/2003 | Brown et al. |
| 2003/0182330 | A1 | 9/2003 | Manley et al. |
| 2003/0182389 | A1 | 9/2003 | Edwards |
| 2003/0221095 | A1 | 11/2003 | Gaunt et al. |
| 2003/0233385 | A1 | 12/2003 | Srinivasa et al. |
| 2004/0003289 | A1 | 1/2004 | Bhogal et al. |
| 2004/0030847 | A1 | 2/2004 | Tremaine |
| 2004/0064483 | A1 | 4/2004 | Bulka et al. |
| 2004/0078704 | A1 | 4/2004 | Malueg et al. |
| 2004/0210706 | A1 | 10/2004 | In et al. |
| 2004/0215600 | A1 | 10/2004 | Aridor et al. |
| 2004/0250172 | A1 | 12/2004 | Patel et al. |
| 2005/0015354 | A1 | 1/2005 | Grubbs et al. |
| 2005/0027746 | A1 | 2/2005 | Lin et al. |
| 2005/0060316 | A1 | 3/2005 | Kamath et al. |
| 2005/0172005 | A1 | 8/2005 | Goodwin |
| 2005/0246612 | A1 | 11/2005 | Leis et al. |
| 2005/0256838 | A1 | 11/2005 | Lasser |
| 2006/0020745 | A1 | 1/2006 | Conley et al. |
| 2006/0095649 | A1 | 5/2006 | Netter et al. |
| 2006/0136529 | A1 | 6/2006 | Pudipeddi et al. |
| 2006/0224578 | A1 | 10/2006 | Kadatch et al. |
| 2007/0136387 | A1 | 6/2007 | Malueg et al. |
| 2007/0239957 | A1 | 10/2007 | Lin |
| 2008/0091702 | A1 | 4/2008 | Pudipeddi et al. |
| 2008/0168029 | A1 | 7/2008 | Pudipeddi et al. |
| 2008/0172425 | A1 | 7/2008 | Patel et al. |
| 2008/0172426 | A1* | 7/2008 | Patel .................. G06F 11/1435 |
| 2008/0177939 | A1 | 7/2008 | Patel et al. |
| 2008/0215646 | A1 | 9/2008 | Pudipeddi et al. |
| 2008/0215647 | A1 | 9/2008 | Pudipeddi et al. |
| 2009/0164440 | A1 | 6/2009 | Pudipeddi et al. |
| 2009/0164539 | A1 | 6/2009 | Pudipeddi et al. |
| 2009/0265400 | A1 | 10/2009 | Pudipeddi et al. |
| 2010/0049776 | A1 | 2/2010 | Patel et al. |
| 2010/0217788 | A1 | 8/2010 | Patel et al. |
| 2012/0011177 | A1 | 1/2012 | Patel et al. |
| 2012/0011179 | A1 | 1/2012 | Patel et al. |
| 2013/0080485 | A1 | 3/2013 | Pudipeddi et al. |

FOREIGN PATENT DOCUMENTS

| | | | |
|---|---|---|---|
| CN | 1790328 | A | 6/2006 |
| EP | 416445 | A2 | 3/1991 |
| EP | 462587 | A2 | 12/1991 |
| EP | 618540 | B1 | 12/2001 |
| EP | 1376405 | A2 | 1/2004 |
| EP | 1677214 | A1 | 7/2006 |
| IL | 172014 | A | 2/2015 |
| JP | S6441039 | A | 2/1989 |
| JP | H01315843 | A | 12/1989 |
| JP | H02148341 | A | 6/1990 |
| JP | H0317753 | A | 1/1991 |
| JP | H04188239 | A | 7/1992 |
| JP | H0619763 | A | 1/1994 |
| JP | H06103140 | A | 4/1994 |
| JP | H07234879 | A | 9/1995 |
| JP | 2001160068 | A | 6/2001 |
| JP | 2001325134 | A | 11/2001 |
| JP | 2002099454 | A | 4/2002 |
| JP | 2002132566 | A | 5/2002 |
| JP | 2003162709 | A | 6/2003 |
| JP | 2003345708 | A | 12/2003 |
| JP | 2004288007 | A | 10/2004 |
| RU | 2159467 | C2 | 11/2000 |
| RU | 2170454 | C2 | 7/2001 |
| TW | 533377 | B | 5/2003 |
| WO | 111486 | A2 | 2/2001 |

OTHER PUBLICATIONS

"Office Action Issued in Brazil Patent Application No. PI0505077-4", dated May 30, 2017, 7 Pages.

"Office Action Issued in Brazilian Patent Application No. PI0505077-4", dated Jul. 17, 2017, 7 Pages.

"Office Action Issued in Canadian Patent Application No. 2,527,060", dated Sep. 5, 2012, 2 Pages.

"Office Action Issued in Canadian Patent Application No. 2,527,060", dated Mar. 25, 2014, 3 Pages.

"Office Action Issued in Canadian Patent Application No. 2,820,339", dated Apr. 28, 2015, 5 Pages.

"Office Action Issued in European Application No. 10012810.7", dated Sep. 21, 2018, 4 Pages.

"Office Action Issued in European Application No. 10012811.5", dated: Sep. 20, 2018, 5 Pages.

"Office Action Issued in European Patent Application No. 05111554.1", dated Sep. 23, 2010, 14 Pages.

"Office Action Issued in European Patent Application No. 05111554.1", dated Jul. 18, 2013, 8 Pages.

"Office Action Issued in European Patent Application No. 05111554.1", dated Dec. 20, 2007, 7 Pages.

"Office Action Issued in European Patent Application No. 10012810.7", dated Jan. 5, 2012, 7 Pages.

"Office Action Issued in European Patent Application No. 10012810.7", dated Jul. 28, 2015, 4 Pages.

"Office Action Issued in European Patent Application No. 10012811.5", dated Dec. 21, 2011, 4 Pages.

"Office Action Issued in European Patent Application No. 10012811.5", dated Jul. 28, 2015, 4 Pages.

"Office Action Issued in Indian Patent Application No. 3021/DEL/2005", dated Dec. 19, 2013, 1 Page.

"Office Action Issued in Indonesia Patent Application No. P00200500645", dated May 14, 2010, 2 Pages.

"Office Action Issued in Indonesian Patent Application No. P00201100295", dated Sep. 28, 2012, 1 Page.

"Office Action Issued in Israel Patent Application No. 172014", dated Aug. 31, 2014, 1 Page.

"Office Action Issued in Israel Patent Application No. 172014", dated Oct. 15, 2013, 7 Pages.

"Office Action Issued in Japanese Patent Application No. 2005-364036", dated Jun. 3, 2011, 6 Pages.

"Office Action Issued in Japanese Patent Application No. 2005-364036", dated Oct. 25, 2011, 4 Pages.

"Office Action Issued in Japanese Patent Application No. 2010-129852", dated Apr. 13, 2012, 4 Pages.

"Office Action Issued in Japanese Patent Application No. 2010-129852", dated Sep. 7, 2012, 4 Pages.

"Office Action Issued in Japanese Patent Application No. 2013-000671", dated Oct. 15, 2013, 4 Pages.

"Office Action Issued in Korean Patent Application No. 10-2005-0110061", dated Jun. 20, 2012, 4 Pages.

"Office Action Issued in Korean Patent Application No. 10-2010-0112978", dated Jun. 20, 2012, 7 Pages.

"Office Action Issued in Malaysian Patent Application No. PI 20055510", dated Jun. 29, 2012, 4 Pages.

"Office Action Issued in Mexico Patent Application No. MX/a/2010/012831", dated Mar. 22, 2013, 4 Pages. (w/o English Translation).

"Office Action Issued in Norway Patent Application No. 20056016", dated Jan. 27, 2015, 3 Pages.

"Office Action Issued in Norway Patent Application No. 20056016", dated Mar. 26, 2014, 6 Pages.

"Office Action Issued in Norway Patent Application No. 20161346", dated Dec. 28, 2016, 5 Pages.

"Office Action Issued in Philippines Patent Application No. 1-2011-000219", dated Feb. 12, 2018, 3 Pages.

(56) References Cited

OTHER PUBLICATIONS

"Office Action Issued in Philippines Patent Application No. PH/1/2005/563", dated Aug. 26, 2008, 1 Page.
"Office Action Issued in Philippines Patent Application No. PH/1/2011/219", dated Oct. 21, 2011, 1 Page.
"Office Action Issued in Philippines Patent Application No. PH/1/2011/219", dated Oct. 27, 2014, 1 Page.
"Office Action Issued in Russian Patent Application No. 2005134810", dated Dec. 14, 2009, 5 Pages. (w/o English Translation).
"Office Action Issued in Russian Patent Application No. 2005134810", dated Oct. 12, 2010, 4 Pages. (w/o English Translation).
"Office Action Issued in Russian Patent Application No. 2010119961", dated Feb. 17, 2015, 5 Pages. (w/o English Translation).
"Office Action Issued in Russian Patent Application No. 2011106779", dated Feb. 6, 2015, 3 Pages. (w/o English Translation).
"Office Action Issued in Singapore Patent Application No. 200507941-3", dated Feb. 19, 2007, 7 Pages.
"Office Action Issued in Taiwan Patent Application No. 102144605", dated Nov. 24, 2015, 7 Pages.
"Office Action Issued in Taiwan Patent Application No. 102144605", dated Aug. 19, 2016, 4 Pages.
"Office Action Issued in Taiwan Patent Application No. 94139703", dated Mar. 25, 2013, 3 Pages. (w/o English Translation).
"Oral Hearing Issued in European Patent Application No. 05111554.1", dated Oct. 6, 2015, 10 Pages.
Gooch, et al., "Overview of the Linux Virtual File Systems", Retrieved From: https://www.kernel.org/doc/Documentation/filesystems/vfs.txt, Jun. 24, 2007, 18 Pages.
"Second Office Action and Search Report Issued in Chinese Patent Application No. 201210063035.0", dated Sep. 2, 2014, 13 Pages.
"Third Office Action Issued in Chinese Patent Application No. 200510125054.1", dated Jul. 13, 2011, 6 Pages.
"Universal Disk Format Specification", Retrieved from: http://www.osta.org/specs/pdf/udf250.pdf, Apr. 30, 2003, 165 Pages.
U.S. Appl. No. 15/411,376; Non-Final Office Action; dated Apr. 7, 2017; 9 pages.
Muthitacharoen, et al., "A low-bandwidth network file system", In ACM SIGOPS Operating Systems Review, vol. 35, No. 5, 2001, 14 Pages.
Karpovich, et al., "Breaking the I/O Bottleneck at the National Radio Astronomy Observatory (NRAO)", In Technical Report CS-94-37, University of Virginia, Department of Computer Science, Sep. 1993, 43 Pages.
"Corrected Office Action Issued in Singapore Patent Application No. 200507941-3", dated Nov. 12, 2007, 8 Pages.
"European Search Report Issued in Application No. 10012810.7", dated Jan. 21, 2011, 5 Pages.
"European Search Report Issued in Application No. 10012811.5", dated Jan. 21, 2011, 11 Pages.
"European Search Report Issued in Patent Application No. 05111554.1", dated May 24, 2006, 8 Pages.
"Final Office Action Issued in U.S. Appl. No. 11/229,485", dated Oct. 17, 2012, 18 Pages.
"Final Office Action Issued in U.S. Appl. No. 11/229,485", dated Nov. 12, 2010, 17 Pages.
"Final Office Action Issued in U.S. Appl. No. 11/229,485", dated Jul. 16, 2008, 12 Pages.
"Final Office Action Issued in U.S. Appl. No. 11/229,485", dated Aug. 18, 2009, 9 Pages.
"Final Office Action Issued in U.S. Appl. No. 12/052,584", dated Jan. 20, 2011, 19 Pages.
"Final Office Action Issued in U.S. Appl. No. 12/052,584", dated Nov. 19, 2012, 11 Pages.
"Final Office Action Issued in U.S. Appl. No. 12/052,594", dated Jan. 17, 2013, 24 Pages.
"Final Office Action Issued in U.S. Appl. No. 12/052,594", dated Apr. 18, 2011, 23 Pages.
"Final Office Action Issued in U.S. Appl. No. 12/052,603", dated Dec. 19, 2012, 13 Pages.
"Final Office Action Issued in U.S. Appl. No. 12/052,603", dated Jul. 16, 2014, 11 Pages.
"Final Office Action Issued in U.S. Appl. No. 12/052,603", dated Apr. 15, 2011, 12 Pages.
"Final Office Action Issued in U.S. Appl. No. 12/493,172", dated Apr. 24, 2012, 25 Pages.
"Final Office Action Issued in U.S. Appl. No. 12/493,172", dated Nov. 21, 2013, 20 Pages.
"Final Office Action received for U.S. Appl. No. 12/493,172", dated Dec. 29, 2014, 23 Pages.
"Final Office Action Received for U.S. Appl. No. 14/075,525", dated May 1, 2015, 12 Pages.
"First Office Action and Search Report Issued in Chinese Patent Application No. 201210063035.0", dated Jan. 26, 2014, 11 Pages.
"First Office Action Issued in Chinese Patent Application No. 201010189026.7", dated Nov. 25, 2010, 8 Pages.
Eager, Bob, "Implementation of Extended Attributes on the FAT File System", Retrieved from: https://web.archive.org/web/20030211023515/http://www.tavi.co.uk/os2pages/eadata.html, Oct. 28, 2000, 3 Pages.
"Non Final Office Action Issued in U.S. Appl. No. 12/493,172", dated Mar. 14, 2013, 34 Pages.
"Non Final Office Action Issued in U.S. Appl. No. 13/685,018", dated Nov. 23, 2015, 18 Pages.
"Non Final Office Action Issued in U.S. Appl. No. 14/842,963", dated Jan. 10, 2018, 34 Pages.
"Non Final Office Action Issued in U.S. Appl. No. 14/842,963", dated Sep. 21, 2018, 35 Pages.
"Non Final Office Action Issued in U.S. Appl. No. 12/389,396", dated Oct. 31, 2011, 12 Pages.
"Non Final Office Action Issued in U.S. Appl. No. 15/411,376", dated Apr. 7, 2017, 10 Pages.
"Non Final Office Action Issued in U.S. Appl. No. 15/411,376", dated May 22, 2018, 8 Pages.
"Non-Final Office Action Issued in U.S. Appl. No. 11/229,485", dated Mar. 30, 2012, 20 Pages.
"Non-Final Office Action Issued in U.S. Appl. No. 11/229,485", dated Nov. 7, 2007, 14 Pages.
"Non-Final Office Action Issued in U.S. Appl. No. 11/229,485", dated Jan. 15, 2009, 11 Pages.
"Non-Final Office Action Issued in U.S. Appl. No. 11/229,485", dated Feb. 22, 2010,, 11 Pages.
"Non-Final Office Action Issued in U.S. Appl. No. 12/052,584", dated Feb. 29, 2012, 11 Pages.
"Non-Final Office Action Issued in U.S. Appl. No. 12/052,584", dated Aug. 17, 2011, 10 Pages.
"Non-Final Office Action Issued in U.S. Appl. No. 12/052,584", dated Jun. 14, 2010, 18 Pages.
"Non-Final Office Action Issued in U.S. Appl. No. 12/052,594",dated Aug. 6, 2010, 16 Pages.
"Non-Final Office Action Issued in U.S. Appl. No. 12/052,594", dated Jun. 12, 2012, 21 Pages.
"Non-Final Office Action Issued in U.S. Appl. No. 12/493,172", dated Aug. 31, 2011, 16 Pages.
"Non-Final Office Action Issued in U.S. Appl. No. 12/493,172", dated Jun. 17, 2014, 23 Pages.
"Non-Final Office Action Issued in U.S. Appl. No. 14/075,525", dated Jul. 28, 2014, 10 Pages.
"Non-Final Office Action Issued in U.S. Appl. No. 12/052,603", dated Jul. 6, 2012, 11 Pages.
"Non-Final Office Action Issued in U.S. Appl. No. 12/052,603", dated Aug. 24, 2010, 11 Pages.
"Non-Final Office Action Issued in U.S. Appl. No. 12/052,603", dated Dec. 17, 2013, 13 Pages.
"Office Action and Search Report Issued in Norway Patent Application No. 20151214", dated Oct. 27, 2015, 5 Pages.
"Office Action and Search Report Issued in Taiwan Patent Application No. 94139703", dated Oct. 5, 2012, 10 Pages.
"Office Action Issued in Australian Patent Application No. 2011200838", dated May 18, 2011, 1 Page.
"Office Action Issued in Brazil Patent Application No. PI 0520885-8", dated May 30, 2017, 6 Pages.

(56) References Cited

OTHER PUBLICATIONS

"Office Action Issued in Russian Patent Application No. 2005134810", dated Sep. 11, 2005, 5 Pages.
"Office Action Issued in Australian Patent Application No. 2005229678", dated May 17, 2010, 1 Page.
"Office Action Issued in Japanese Patent Application No. 2012-040595", dated Mar. 26, 2013, 4 Pages.
"Office Action Issued in Chile Patent Application No. 293605", dated Nov. 11, 2005, 6 Pages.
Amy, Rich, "ZFS, Sun's Cutting-Edge File System System (Part 1: Storage Integrity, Security, and Scalability)", In BigAdmin Administration Portal, Aug. 2006, 8 Pages.
Barreto, et al., "A Highly Available Replicated File System for Resource-Constrained Windows CE .Net Devices", In 3rd International Conference on .Net Technologies, May 30, 2005, 6 Pages.
Bonner, Paul, "Build a Document Manager Under Windows", In PC/Computing, vol. 04, Issue 12, Dec. 1991, 10 Pages.
Bonner, Paul, "What's in a Name?", In PC/Computing, vol. 2, Issue 9, Sep. 1989, 2 Pages.
Chen, et al., "The Rio File Cache: Surviving Operating System Crashes", In Proceedings of the Seventh International Conference on Architectural Support for Programming Languages and Operating Systems, Oct. 1, 1996, 11 Pages.
Duncan, Ray, "Design Goals and Implementation of the New High Performance File System", In Journal of Microsoft Systems, vol. 4, Issue 5, Sep. 1989, 13 Pages.
Duncan, Ray, "Power Programming Using Long Filenames and Extended Attributes, Part 1", In PC Magazine, vol. 9, Issue 8, Apr. 24, 1990, 6 Pages.
Duncan, Ray, "Power Programming Using Long Filenames and Extended Attributes, Part II", In PC Magazine, May 15, 1990, 6 Pages.
Farr, et al., "An Optimum Disc Organization for a Virtual Memory System", In Computer Design, Jun. 1971, 7 Pages.
Glass, Brett, "Create Your Own Environment", In Journal of PC-Computing, vol. 3, Issue 10, Oct. 1990, 5 Pages.
Hiroo, Shirasaki, "Observe the Boot Process of FreeBSD 14", In UNIX Magazine, vol. 20, Issue 2, ACII Corporation, Japan, Feb. 1, 2005, pp. 91-99.
Hurwicz, Mike, "MS-DOS 3.1 Makes It Easy to Use IBM PCs on a Network", In Data Communications, Nov. 1985, 10 Pages.
Jonnge, et al., "The Logical Disk: A New Approach to Improving File Systems", In Proceedings of the Fourteenth ACM Symposium on Operating Systems Principles, Dec. 1993, 14 Pages.
Karpovich, et al., "Extensible File System (ELFS): An Object-Oriented Approach to High Performance File I/O", In Proceedings of the Ninth Annual Conference on Object-Oriented Programming Systems, Language, and Applications, Jul. 22, 1994, pp. 191-204.
Kashyap, Aditya, "File System Extensibility and Reliability Using an in-Kernel Database", A Thesis Presented to The Graduate School in partial fulfillment of the Requirements for the degree of Master of Science in Computer Science, Stony Brook University, Dec. 2004, 30 Pages.
Khalidi, et al., "Extensible File System in Spring", In SOSP '93 Proceedings of the Fourteenth ACM Symposium on Operating Systems Principles, Jan. 3, 1994, 18 Pages.
Leffler, et al., "The Design and Implementation of the 4.3BSD UNIX Operating System", by Addison-Wesley Publishing Company, Jun. 1, 1989, 5 Pages.
Lent, et al., "New, Improved Windows", In PC World, vol. 11, Issue 12, Dec. 1993, 17 Pages.
Mallory, Jim, "Breakthrough on DOS Filename Limits", In Newsbytes, NEW04120025, Retrieved on: May 24, 2006, 1 Page.
McCormick, John, "Presentation Manager Under OS/2 Encourages Lengthy Name-Calling", In Government Computer News, vol. 09, Issue 10, May 14, 1990, 2 Pages.
O'Malley, Chris, "Fetching Desktop Files: Standalone Document Managers", In Windows Sources, vol. 1, Issue 2, Mar. 1993, 2 Pages.

Otoo, et al., "Non-shared Disk Cluster—A Fault Tolerant, Commodity Approach to Hi-Bandwidth Data Analysis", Retrieved from <<http://citeseerx.ist.psu.edu/viewdoc/download?doi=10.1.1.133.7039&rep=repl&type=pdf>>, Retrieved on: Sep. 2001, 6 Pages.
"Office Action Issued in Mexican Patent Application No. PA/a/2005/012405", dated Mar. 10, 2010, 4 Pages.
"Office Action Issued in Mexican Patent Application No. PA/a/2005/012405", dated May 6, 2009, 2 Pages.
Rohan, Rebecca, "Golden Retriever Fetches Files in Windows", In Journal of Computer Shopper, vol. 12, Issue 11, Nov. 1, 1992, 2 Pages.
San, Lee Chiung., "Server-Based Maintenance Approach for Computer Classroom Workstations", In IEICE Transactions on Information and Systems, vol. E83-D, Issue 4, Apr. 25, 2000, pp. 807-814.
Shullich, Robert, "Reverse Engineering the Microsoft Extended FAT File System (exFAT)", In SANS InfoSec Institute Reading Room, Dec. 1, 2009, 86 Pages.
Sivathanu, et al., "Life or Death at Block-Level", In Proceedings of the 6th Symposium on Operating Systems Design and Implementation (OSDI '04), Dec. 6, 2004, 16 Pages.
Tanenbaum, et al., "Chapter 5: File System", In Book Minix Operating System: First Edition, Published by Keiichiro Sakamoto, Apr. 21, 1989, pp. 310-313.
Tanenbaum, Andrew S., "Modern Operating Systems: Second Edition", Published by Prentice Hall PTR, Jan. 2001, 17 Pages.
Trivette, Donald B., "Utility Provides 60-Character Filenames", In PC Magazine, vol. 07, Issue 16, Sep. 27, 1988, 1 Page.
Wang, Gail Y.E., "Universal_File_Names for Ada", In ACM SigAda, Ada Letters vol. 10, Issue 1, Jan. 1990, pp. 111-117.
Yamamori, Takenori, "Guide to Rise Higher than a Novice, PC UNIX Deciphered from Boot Files", In Software Design, Issue 131, Sep. 18, 2001, pp. 110-121.
"Above Software Introduces Golden Retriever 2.0b", In News Release by IBM, Mar. 29, 1993, 1 Page.
"File Sharing Protocol", Retrieved from <<https://download.samba.org/pub/samba/specs/corep.txt>>, Nov. 7, 1988, 69 Pages.
"Flush", In Book Microsoft Press Computer Dictionary Third Edition, Sep. 1, 1997, 1 Page.
"Fragmentation", In Book Microsoft Press Computer Dictionary Third Edition, Sep. 1, 1997, 1 Page.
"Long Filenames", In Windows 95 Beta 2 Release SDK, Article 15, Oct. 28, 1994, 29 Pages.
"The Intelligent Way to Search", In News Release, Dateline: Burlington, Massachusetts, Oct. 1987, 1 Page.
"Transactional File Access", In Commons Transactions by Apache Commons, Version: 1.3-SNAPSHOT, Jun. 2, 2005, 1 Page.
"Transaction-Safe FAT File System", Retrieved from <<https://msdn.microsoft.comien-us/library/aa516909.aspx>>, Retrieved on: May 30, 2006, 1 Page.
"World Software Corporation (WSC) Launches Extend-a-name in Europe", In Computer Product Update, Jul. 27, 1990, 2 Pages.
"Office Action Issued in European Patent Application No. 05111554.1", dated Jun. 24, 2009, 4 Pages.
"Non Final Office Action issued in U.S. Appl. No. 11/752,872", dated Nov. 12, 2009, 7 Pages.
"Non Final Office Action Issued in U.S. Appl. No. 11/752,872", dated Jul. 23, 2009, 5 Pages.
"Notice of Allowance Issued in U.S. Appl. No. 11/752,872", dated May 6, 2010, 7 Pages.
"Notice of Allowance Issued in U.S. Appl. No. 11/752,872", dated Jul. 8, 2010, 5 Pages.
"Notice of Allowance Issued in U.S. Appl. No. 11/752,872", dated Sep. 2, 2010, 5 Pages.
"Notice of Allowance Issued in U.S. Appl. No. 11/752,872", dated Nov. 30, 2010, 4 Pages.
"Final Office Action Issued in U.S. Appl. No. 12/389,391", dated Feb. 21, 2013, 10 Pages.
"Non Final Office Action issued in U.S. Appl. No. 12/389,391", dated Apr. 14, 2011, 12 Pages.
"Non Final Office Action issued in U.S. Appl. No. 12/389,391", dated Jul. 31, 2012, 7 Pages.
"Notice of Allowance Issued in U.S. Appl. No. 12/389,391", dated Aug. 7, 2013, 13 Pages.

(56) References Cited

OTHER PUBLICATIONS

"Final Office Action Issued in U.S. Appl. No. 13/006,063", dated May 30, 2012, 8 Pages.
"Non Final Office Action Issued in U.S. Appl. No. 13/006,063", dated Dec. 22, 2011, 7 Pages.
"Non Final Office Action Issued in U.S. Appl. No. 13/006,063", dated Apr. 27, 2011, 5 Pages.
"Notice of Allowance Issued in U.S. Appl. No. 13/006,063", dated Nov. 26, 2012, 10 Pages.
"Notice of Allowance Issued in U.S. Appl. No. 13/006,063", dated Jan. 2, 2013, 6 Pages.
"Non Final Office Action Issued in U.S. Appl. No. 13/006,088", dated May 18, 2011, 8 Pages.
"Non Final Office Action Issued in U.S. Appl. No. 13/006,088", dated Dec. 21, 2011, 8 Pages.
"Notice of Allowance Issued in U.S. Appl. No. 13/006,088", dated Jun. 5, 2012, 10 Pages.
"Notice of Allowance Issued in U.S. Appl. No. 13/006,088", dated Aug. 14, 2012, 3 Pages.
"Notice of Allowance Issued in U.S. Appl. No. 13/006,088", dated Sep. 11, 2012, 6 Pages.
"Non Final Office Action Issued in U.S. Appl. No. 13/162,189", dated Nov. 10, 2011, 7 Pages.
"Notice of Allowance Issued in U.S. Appl. No. 13/162,189", dated Apr. 6, 2012, 6 Pages.
"Notice of Allowance Issued in U.S. Appl. No. 13/162,189", dated Aug. 15, 2012, 6 Pages.
"Notice of Allowance Issued in U.S. Appl. No. 13/162,189", dated Dec. 24, 2012, 6 Pages.
"Non Final Office Action Issued in U.S. Appl. No. 13/875,386", dated Jul. 30, 2013, 10 Pages.
"Notice of Allowance Issued in U.S. Appl. No. 13/875,386", dated Jan. 7, 2014, 7 Pages.
"Final Office Action Issued in U.S. Appl. No. 13/901,997", dated Jan. 14, 2014, 6 Pages.
"Non Final Office Action Issued in U.S. Appl. No. 13/901,997", dated Jul. 15, 2013, 6 Pages.
"Notice of Allowance Issued in U.S. Appl. No. 13/901,997", dated Apr. 1, 2014, 9 Pages.
"Final Office Action Issued in U.S. Appl. No. 14/099,307", dated Jun. 17, 2016, 11 Pages.
"Non-Final Office Action Issued in U.S. Appl. No. 14/099,307", dated Apr. 8, 2015, 10 Pages.
"Non-Final Office Action Issued in U.S. Appl. No. 14/099,307", dated Oct. 23, 2015, 9 Pages.
"Non Final Office Action Issued in U.S. Appl. No. 14/456,419", dated Jan. 15, 2015, 6 Pages.
"Notice of Allowance Issued in U.S. Appl. No. 14/456,419", dated Apr. 29, 2015, 6 Pages.
"Non-Final Office Action Issued in U.S. Appl. No. 14/815,076", dated Feb. 26, 2016, 7 Pages.
"Notice of Allowance Issued in U.S. Appl. No. 14/815,076", dated Jun. 10, 2016, 6 Pages.
"Notice of Allowance Issued in U.S. Appl. No. 14/815,076", dated Sep. 16, 2016, 5 Pages.
"Office Action Issued in Israel Patent Application No. 172014", dated Dec. 17, 2009, 4 Pages.
"Office Action Issued in Chinese Patent Application No. 200510125054.1", dated Jul. 4, 2008, 8 Pages.
"Office Action Issued in Chinese Patent Application No. 200510125054.1", dated Jan. 15, 2010, 9 Pages.
"Final Office Action Issued in U.S. Appl. No. 14/842,963", dated Jun. 11, 2019, 7 Pages.
"Office Action Issued in European Patent Application No. 10012811.5", dated Dec. 3, 2019, 4 Pages.

\* cited by examiner

| NAME | SIZE |
|---|---|
| IN USE | 1:1 |
| TYPE | 1:7 |
| CHARACTERS | 1 |
| NAME HASH | 2 |
| FILE NAME | 28 |

*Fig.6.*

| NAME | SIZE |
|---|---|
| IN USE | 1:1 |
| TYPE | 1:7 |
| SECONDARY ENTRIES | 1 |
| GUID | 16 |

*Fig.7.*

| NAME | SIZE |
|---|---|
| OEM NAME | 3 |
| DATA SIZE DESCRIPTORS | X |
| ACTIVE FAT | 2 |
| VOLUME SERIAL NUMBER | 4 |
| FILE SYSTEM TYPE | X |

*Fig.4.*

| NAME | SIZE |
|---|---|
| IN USE | 1:1 |
| TYPE | 1:7 |
| SECONDARY ENTRIES | 1 |
| ATTRIBUTES | 2 |
| TIME | X |
| TIME ZONE | 1 |

| NAME | SIZE |
|---|---|
| IN USE | 1:1 |
| TYPE | 1:7 |
| SECONDARY ENTRIES | 1 |
| GUID | 16 |
| ALLOCATION FLAG | 1 |
| OTHER | X |

800 — NAME/SIZE
802 — IN USE/1:1
804 — TYPE/1:7
806 — SECONDARY ENTRIES/1
808 — GUID/16
810 — ALLOCATION FLAG/1
812 — OTHER/X

Fig. 9.

| NAME | SIZE |
|---|---|
| IN USE | 1:1 |
| TYPE | 1:7 |
| SECONDARY | 16 |
| GUID | 16 |
| ALLOCATION FLAG | 1 |
| OTHER | X |

900 — NAME/SIZE
902 — IN USE/1:1
904 — TYPE/1:7
906 — SECONDARY/16
908 — GUID/16
910 — ALLOCATION FLAG/1
912 — OTHER/X

Fig. 10.

| NAME | SIZE |
|---|---|
| IN USE | 1:1 |
| TYPE | 1:7 |
| ACL INFORMATION | X |

1000 — NAME/SIZE
1002 — IN USE/1:1
1004 — TYPE/1:7
1006 — ACL INFORMATION/X

EXTENDING CLUSTER ALLOCATIONS IN AN EXTENSIBLE FILE SYSTEM

CROSS-REFERENCE TO RELATED APPLICATIONS

This application is a continuation of U.S. application Ser. No. 14,815,076, filed on Jul. 31, 2015, which is continuation of U.S. application Ser. No. 14/456,419, filed Aug. 11, 2014, entitled "Extending Cluster Allocations in an Extensible File System," which is a continuation of U.S. application Ser. No. 13/901,997, filed May 24, 2013, entitled "Extending Cluster Allocations in an Extensible File System," which is a continuation of U.S. application Ser. No. 13/006,063, filed Jan. 13, 2011, entitled "Extending Cluster Allocations In An Extensible File System" (now U.S. Pat. No. 8,452,729), which is a divisional of U.S. application Ser. No. 11/752,872, filed May 23, 2007, entitled "Extending Cluster Allocations In An Extensible File System" (now U.S. Pat. No. 7,873,596), which claims the benefit of U.S. Provisional Application No. 60/802,922, entitled "Naming Protocol for Extensible File System," filed May 23, 2006, all of the foregoing of which are incorporated herein by reference in their entireties.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they do not provide adequate flexibility for increasing storage size capacities and/or storage media applications.

In one embodiment, extensible file systems may be utilized in these embodiments to allow for increased storage size capacities and application to storage media application. In one embodiment of an extensible file system, data may be stored in allocated clusters within a file system. As the amount of data increases, the number of allocated clusters may also increase. Accordingly, in these embodiments, each new allocated cluster would likely be added as a new entry in the file system, such as an additional entry in a file allocation table. The additional allocation and management of each separate cluster in an allocation can become inefficient for file system management.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An extensible file system format for portable storage media is provided. The extensible file system format includes the specification of primary and secondary directory entry types that may be custom defined. The primary and secondary directory entry types can be further classified as critical and benign directory entries. The directory entry types can define whether a cluster chain corresponding to a file can be contiguously allocated.

A computer-readable medium having computer-executable components for storing data is provided. The components include a boot parameters component for specifying boot parameters for a file system. The components also include a file allocation table component for defining a file allocation table associated with the file system. The components further include two or more primary directory entry components for specifying data in a root directory of the file system. At least one primary directory entry component includes a flag corresponding to an indication of a contiguous cluster chain. Finally, the components include at least one secondary entry component corresponding to the primary directory entry component and defining meta data associated with the primary directory entry component.

In accordance with another aspect, a method for managing data organized into a plurality of clusters is provided. In accordance with the method, a request for an extension of a plurality of clusters is obtained. A determination is made whether the set of clusters can be contiguously allocated. If the set of clusters can be contiguously allocated, a cluster chain size allocation is updated in accordance with the size of the request for the extension. If the set of clusters cannot be contiguously allocated, entries are made in the file allocation table for each cluster in the cluster chain.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a block diagram illustrative of data components for implementing a boot process block in an extensible file system format in accordance with an aspect of the present invention;

FIG. 5 is a block diagram illustrative of data components for implementing directory entries in an extensible file system format in accordance with an aspect of the present invention FIG. 6 is a block diagram illustrative of data components for implementing a file name and extensions in an extensible file system format in accordance with an aspect of the present invention;

FIG. 7 is a block diagram illustrative of data components for implementing a volume identifier in an extensible file system format in accordance with an aspect of the present invention;

FIG. 8 is a block diagram illustrative of data components for implementing an extensible directory entry in an extensible file system format in accordance with an aspect of the present invention;

FIG. 9 is a block diagram illustrative of data components for implementing an extensible directory entry in an extensible file system format in accordance with an aspect of the present invention;

FIG. 10 is a block diagram illustrative of data components for implementing an access control list in an extensible file system format in accordance with an aspect of the present invention;

DETAILED DESCRIPTION

Generally described, the present invention relates to an extensible file system format and various processes associated with the extensible file system format. In an illustrative embodiment, the extensible file system format corresponds to an extensible file system format for portable storage media and various processes associated with the extensible file system format on the portable storage media. More specifically, in an embodiment, processes and data structures are provided for facilitating the storage and management of file data in contiguous data clusters. Although the present invention will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

Figure 1A:
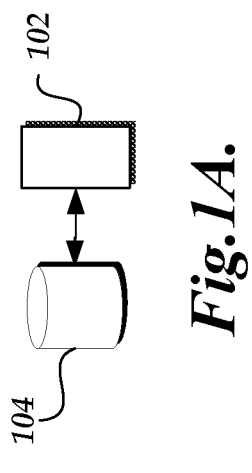
FIGS. 1A-1C are block diagrams illustrative of an illustrative environment including a portable computing device and a storage device implementing the extensible file system format in accordance with an aspect of the present invention.
Figure 1B:
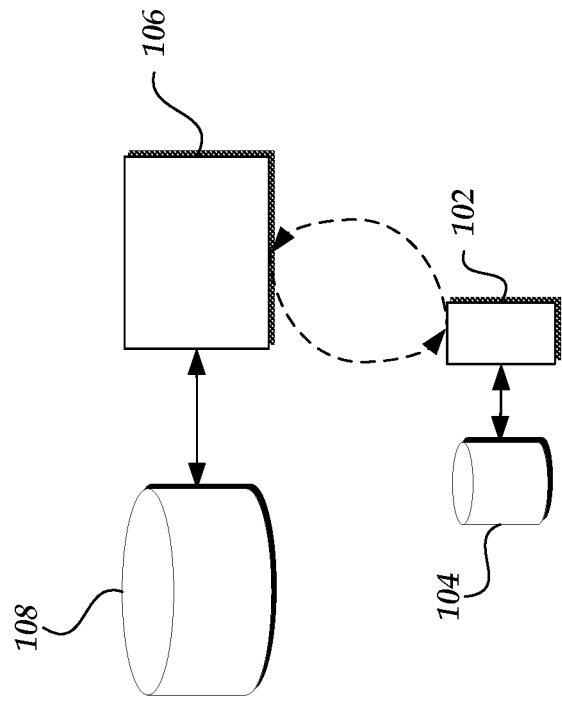
Figure 1C:
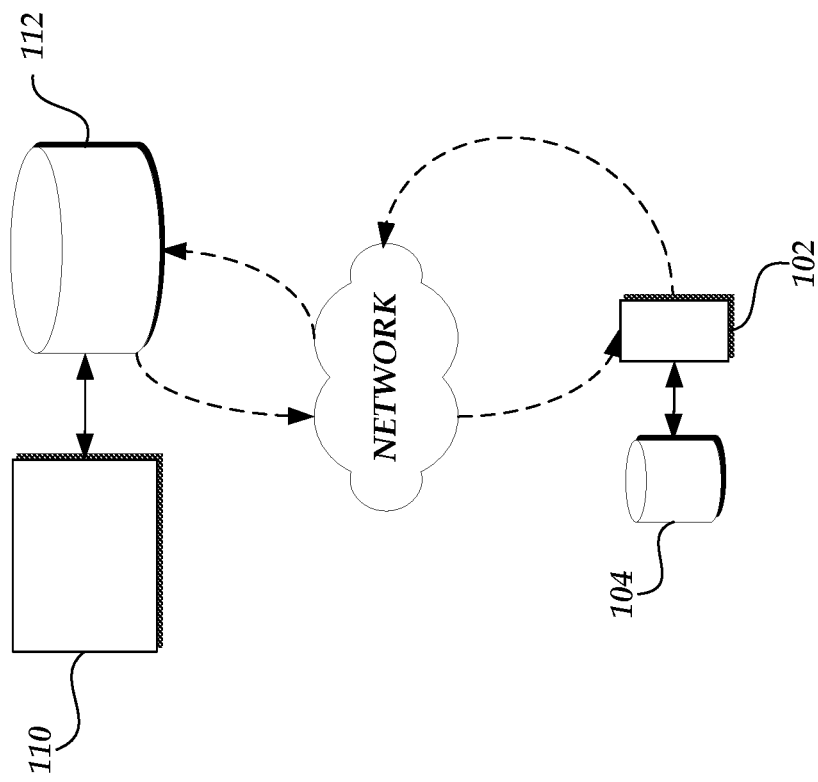

FIGS. 1A-1C are block diagrams illustrative of various operating environments 100 for the extensible file system format of the present invention. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, micro-drives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format of the present invention. With reference to FIG. 1C, in a similar manner, the mobile computing device 102 may also be in communication with another computing device 110 and storage media 112, via a network connection. In an illustrative embodiment, the network connection can correspond to local area network (LAN) and wide area network (WAN) connections.

Figure 2:
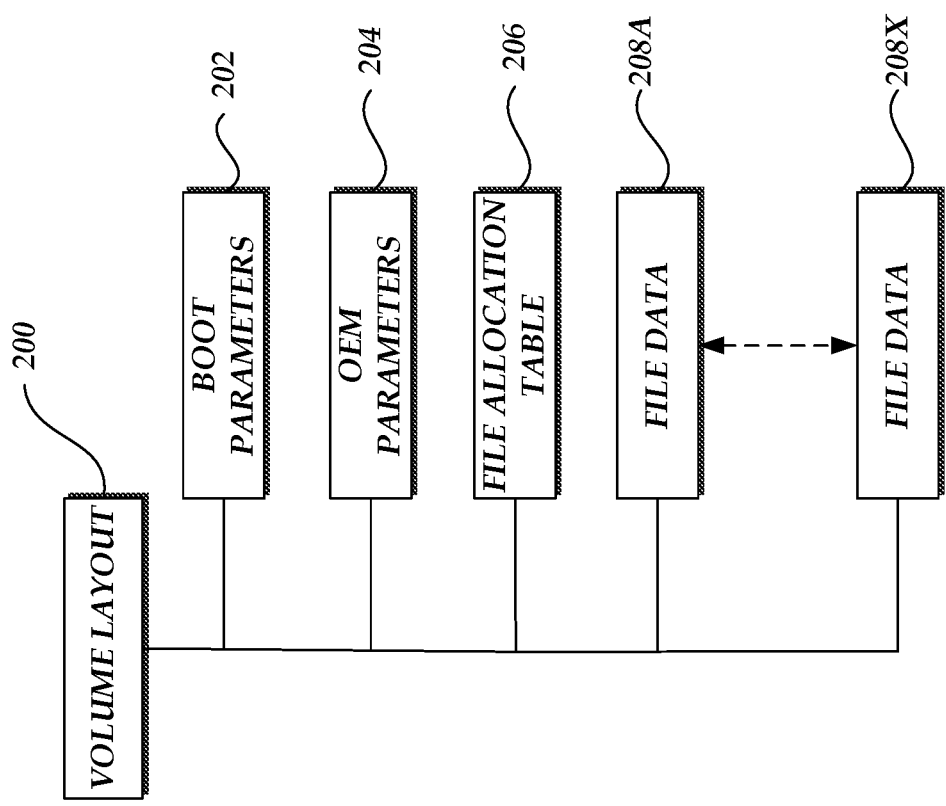
FIG. 2 is a block diagram illustrative of various volume layout components corresponding to an extensible file system format in accordance with an aspect of the present invention.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacturer (OEM) may specify various extensible data structures, such as performance parameters for a storage medium, that can be defined at time of manufacture. The volume layout 200 can further include a file allocation table component 206 that defines file and directory allocations. In an illustrative embodiment, each entry in the file allocation table component 206 corresponds to a 32-bit entry that represents an allocated cluster, an unallocated cluster or an unusable cluster. As will be explained in greater detail below, in an illustrative embodiment, contiguously allocated clusters will not require a separate entry for each allocated cluster in the file allocation table component 206. The volume layout 200 can still further include series of file data components 208A-208X that correspond to the data stored according to the file system format. Various data structures for defining a portion of the file data components 208A-208X will be defined with regard to FIGS. 3-10.

Figure 3:
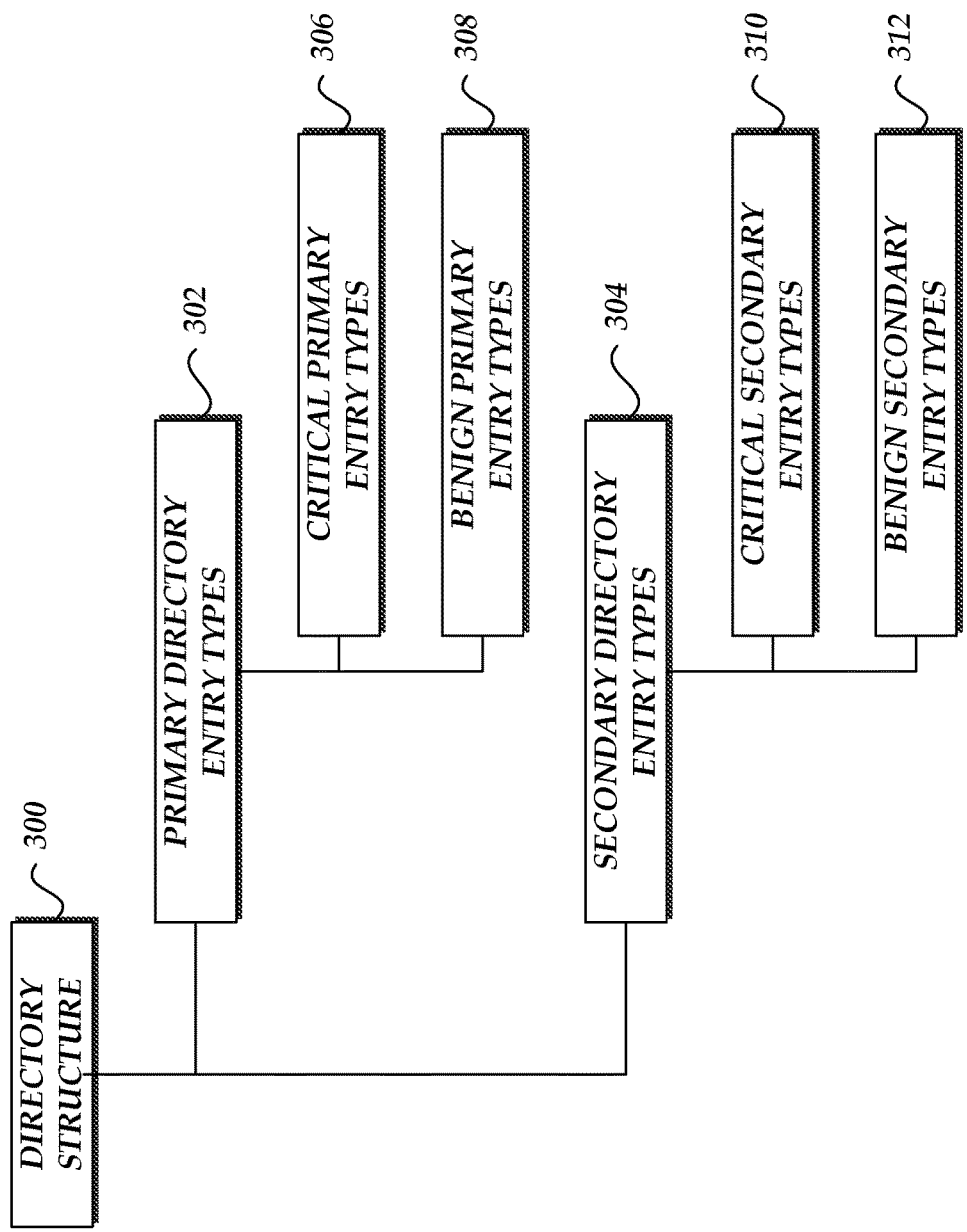
FIG. 3 is a block diagram illustrative of an extensible file system directory structures including primary and secondary directory entry structures in accordance with an aspect of the present invention.

Turning now to FIG. 3, in one aspect, the file data components 208 may include one or more directory entries according to a directory structure 300. In an illustrative embodiment, the directory structure 300 is organized into primary directory entries 302 and secondary directory entries 304. Each directory entry in the primary and secondary entries is typed. For example, in an illustrative embodiment, type values for the primary and secondary directory entries can correspond to a range of 1-255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below.

Examples of known primary directory entries 306 can include allocation bitmaps, up-case tables, volume labels, encryption keys, and normal directory entries. Benign primary directory entries 308 also define potential different formats for each directory entry, but can be ignored by the file system if a particular benign primary directory entry is not understood. Benign primary directory entries 308 can be associated with another cluster chain in the volume and can be contiguously allocated. For example, a contiguously allocated benign primary directory entry can be identified through the setting of a corresponding flag. Additionally, benign primary directory entries 308 can also be associated with a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain in the volume and can be contiguously allocated.

To mount a volume corresponding to the extensible file system format, the file system implements a mount volume procedure. In an illustrative embodiment, the mount volume procedure attempts to look at a version number for the volume. If the version number is not understood (e.g., the version number is higher), the volume will not be mounted. During a normal directory enumeration, any critical primary directory entries not known by the file system will prevent the volume from being mounted. Thereafter, various user-initiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a file allocation table ("FAT") table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above-identified components 402-410 and additional components.

Turning now to FIG. 5, a block diagram illustrative of data components 500 for implementing directory entries in an extensible file system format will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 504 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above-identified components 502-512 and additional components.

Turning now to FIG. 6, a block diagram illustrative of data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name hash component 608. The utilization of the file name hash component 608 will be described below. The data components 600 also include a file name component 610 for specifying the file name. One skilled in the relevant art will appreciate that the data components 600 can include a number of additional/alternative rows for implementing the above-identified components 602-610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/ alternative rows for implementing the above-identified components 702-708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include a flag component 810 that corresponds to an indication of whether contiguous allocation of a cluster chain is to be implemented. The data components 800 can still further include additional information 812, such as verification information and a starting cluster. As will be explained in greater detail below, cluster chains utilizing contiguous allocation can be defined according to cluster chain size and a starting cluster for the first cluster in the cluster chain. One skilled in the relevant art will appreciate that the data components 800 can include a number of additional/alternative rows for implementing the above-identified components 802-812 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 further include a secondary directory entries component 906 for specifying a number of secondary entries associated with the volume identifier. The data components 900 also include a volume identifier 908, such as a global unique identifier. The data components 900 can further include a flag component 910 that corresponds to an indication of whether contiguous allocation of a cluster chain is to be implemented. The data components 900 can further include additional information 912, such as verification information and a starting cluster. One skilled in the relevant art will appreciate that the data components 900 can include a number of additional/alternative rows for implementing the above-identified components 902-912 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above-identified components 1002-1006 and additional components.

In accordance with an aspect of the invention, the utilization of contiguously allocated clusters in a cluster chain mitigates the need for traversing the file allocation table component 206 to identify the clusters in the cluster chain. Because the clusters will be contiguously allocated, each cluster in the chain can be identified with knowledge of the starting location of the first cluster in the chain and the total cluster chain size. For example, assume that each cluster has a size of 4K of data and that the total allocation for a cluster chain is 18 K of data. The cluster chain will require five clusters to capture the data. If the first cluster begins at cluster position 40, then cluster positions 41, 42, 43 and 44 would be taken by the remaining four contiguously allocated clusters in the cluster chain.

Figure 11:
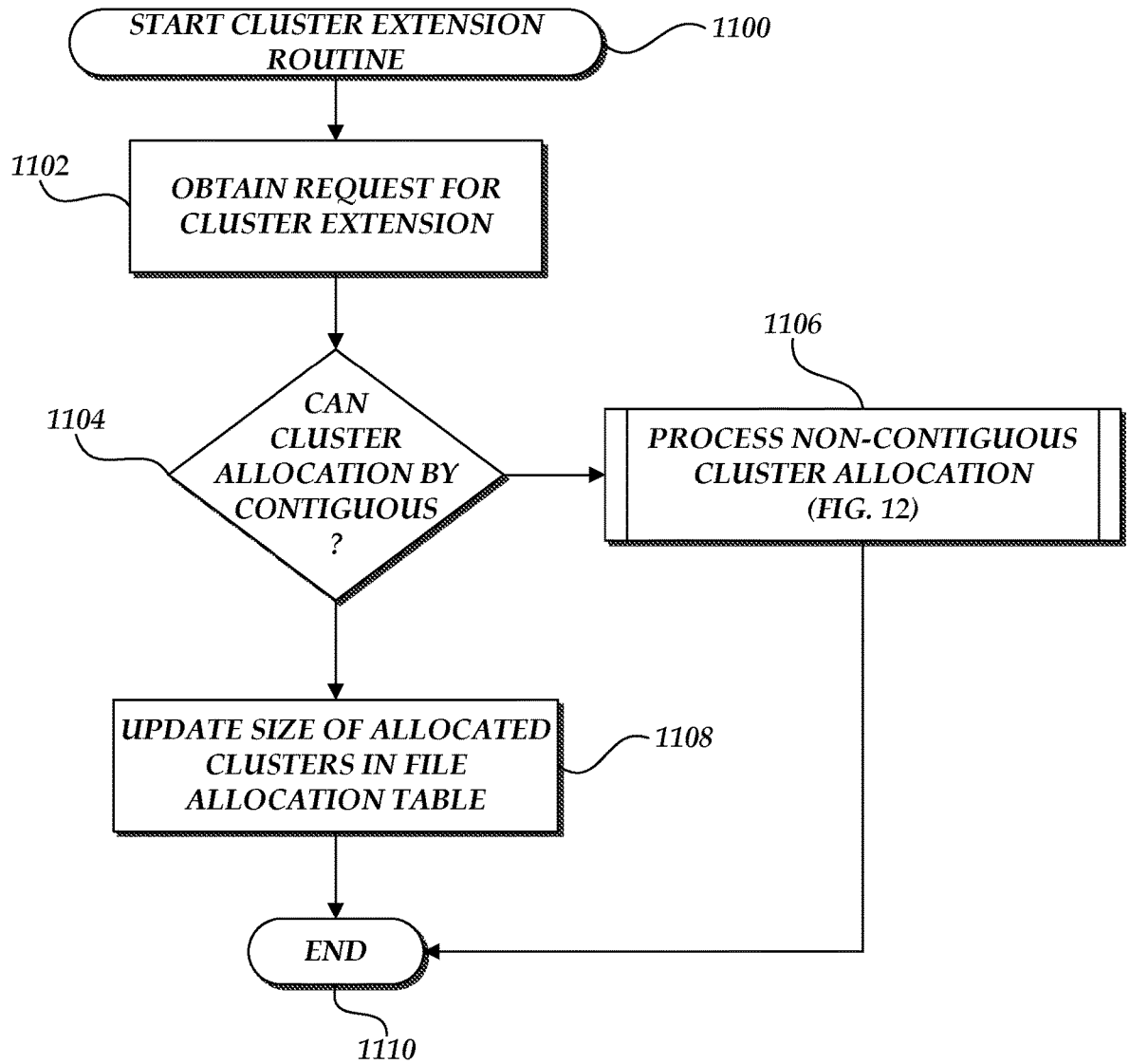
FIG. 11 is a flow diagram illustrative of a cluster chain extension routine for an extensible file system format in accordance with an aspect of the present invention.

In addition to the storage and processing of contiguously allocated clusters, additional processes may be utilized in the extension of a cluster chain. With reference now to FIG. 11, a cluster chain extension routine 1100 for an extensible file system format will be described. At block 1102, a request for extending or modifying the cluster chain is obtained. In an illustrative embodiment, the request for the extension of the cluster chain can correspond to the addition, substitution, modification or rewriting of data.

At decision block 1104, a test is conducted to determine whether the contiguous allocation is available for the cluster chain associated with the request. In an illustrative embodiment, the determination of whether contiguous allocation is available can correspond to a determination of whether the first cluster in the cluster chain includes the contiguous allocation flag set in the flag components (810 or 910). In another embodiment, the determination of whether contiguous allocation is available can correspond to a determination of whether additional contiguous clusters are available. In this embodiment, the last cluster in the cluster chain can be located by identifying the first cluster in the cluster chain and determining the cluster chain size. The determination can check whether contiguous clusters are available, such as by referring to the allocation bitmap.

If contiguous allocation is not available, at block 1106, the entire cluster chain is subject to a noncontiguous allocation. A subroutine for allocating a cluster chain in a noncontiguous manner will be described below with regard to FIG. 12. Alternatively, if contiguous allocation is available, at block 1108, the cluster chain size is updated to reflect the additional cluster. The routine 1100 terminates at block 1110.

Figure 12:
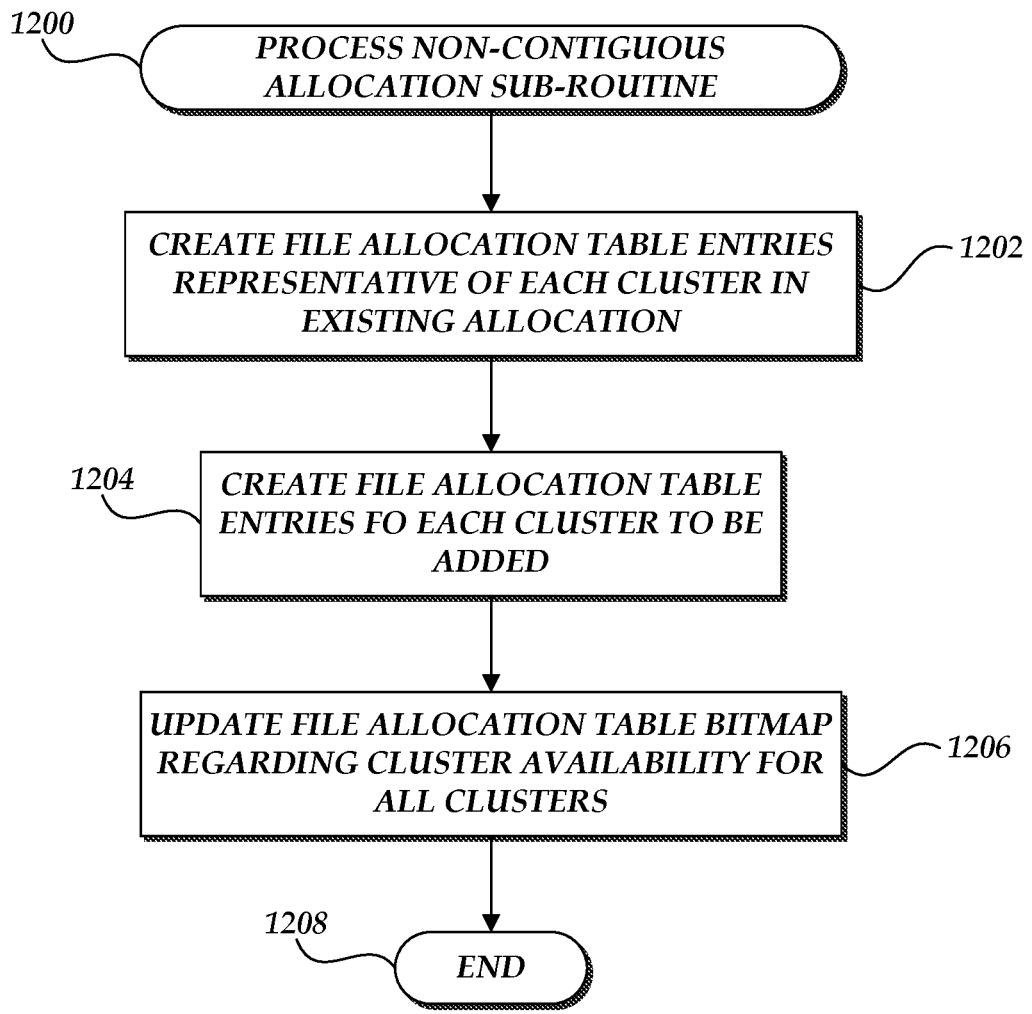
FIG. 12 is a flow diagram of a non-contiguous cluster allocation sub-routine for an extensible file system format in accordance with an aspect of the present invention.

With reference now to FIG. 12, a subroutine for making a noncontiguous allocation of a cluster chain (corresponding to block 1106) will be described. At block 1202, an entry for each existing cluster in the cluster chain is created in the FAT table component 206. Each cluster will also have the flag component 806/906 set to indicate no contiguous allocations. At block 1204, an entry for each cluster to be added will be created in the FAT table component 206. At block 1206, the bitmap allocation will be updated to reflect that allocation of each cluster in the cluster chain. At block 1208, the subroutine returns.

Figure 13:
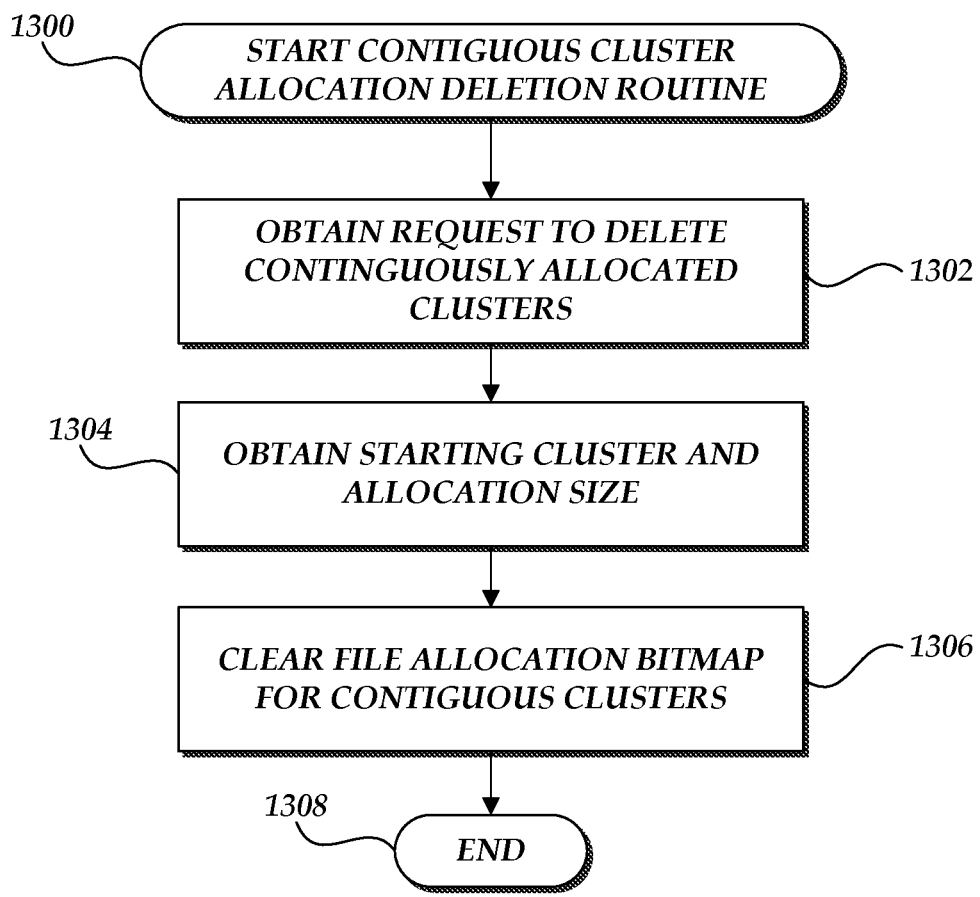
FIG. 13 is a flow diagram of a cluster chain deletion routine for an extensible file system format in accordance with an aspect of the present invention.

With reference now to FIG. 13, a routine 1300 for cluster chain deletion will be described. At block 1302, a request for extending or modifying the cluster chain is obtained. In an illustrative embodiment, the request for the extension of the cluster chain can correspond to the substitution, modification or rewriting of data. At block 1304, the starting cluster associated with the identified cluster chain is identified. Additionally, the allocation size of the cluster chain is also obtained. At block 1306, the FAT allocation bitmap entries for each cluster corresponding to the allocated cluster chain are cleared. At block 1308, the routine 1300 terminates. In an illustrative embodiment, the bitmap entries for each cluster can be cleared without having to traverse the FAT entry for each allocated cluster in the cluster chain.

While illustrative embodiments have been illustrated and described, it will be appreciated that various changes can be made therein without departing from the spirit and scope of the invention.

What is claimed:

1. In a computing device that implements a file system for storing data on a storage medium, the storage medium comprising a plurality of clusters, a method comprising:
   storing, on the storage medium, information defining a file allocation table associated with the file system;
   storing, on the storage medium, an allocation bitmap comprising, for each cluster of the storage medium, an entry that indicates whether the cluster is allocated or is available for storage;
   storing, on the storage medium, a directory entry specifying information concerning data in a directory of the file system, wherein the directory entry comprises a flag that indicates that the data is stored in a chain of contiguous clusters, the directory entry further comprising information specifying a starting cluster of the chain of contiguous clusters and information indicative of a size of the chain of contiguous clusters;
   obtaining a request to delete the data;
   determining from the flag in the directory entry for the data that the data is stored in the chain of contiguous clusters;
   identifying the contiguous clusters of the chain based on the information from the directory entry specifying the starting cluster of the chain and indicative of the size of the chain, without traversing the file allocation table; and
   updating the entries of the allocation bitmap corresponding to each of the identified clusters of the chain of contiguous clusters to indicate that each cluster is available for storage.

2. A computing device that implements a file system for storing data on a storage medium, the storage medium comprising a plurality of clusters, the computing device configured to:
   store, on the storage medium, information defining a file allocation table associated with the file system;
   store, on the storage medium, an allocation bitmap comprising, for each cluster of the storage medium, an entry that indicates whether the cluster is allocated or is available for storage;
   store, on the storage medium, a directory entry specifying information concerning data in a directory of the file system, wherein the directory entry comprises a flag that indicates that the data is stored in a chain of contiguous clusters, the directory entry further comprising information specifying a starting cluster of the chain of contiguous clusters and information indicative of a size of the chain of contiguous clusters;
   obtain a request to delete the data;
   determine from the flag in the directory entry for the data that the data is stored in the chain of contiguous clusters;
   identify the contiguous clusters of the chain based on the information from the directory entry specifying the starting cluster of the chain and indicative of the size of the chain, without traversing the file allocation table; and
   update the entries of the allocation bitmap corresponding to each of the identified clusters of the chain of contiguous clusters to indicate that each cluster is available for storage.

3. The method recited in claim 1, further comprising:
   storing, on the storage medium, another directory entry specifying information concerning other data in the directory of the file system, wherein the another directory entry comprises a flag that indicates that the other data is stored in one or more clusters of the storage medium that are not contiguous;
   obtaining a request to delete the other data;
   determining from the flag in the another directory entry that the other data is not stored in contiguous clusters;
   identifying the one or more non-contiguous clusters in which the other data is stored by traversing entries of the file allocation table corresponding to each of the one or more non-contiguous clusters; and
   updating the entries of the allocation bitmap corresponding to each of the identified one or more non-contiguous clusters to indicate that each cluster is available for storage.

4. The method recited in claim 1, the updating the corresponding entries of the allocation bitmap comprising clearing the entries.

5. The method recited in claim 1, the identifying the contiguous clusters of the chain being further based on a size of each cluster.

6. The method recited in claim 1, the flag comprising a single bit.

7. The method recited in claim 1, the storage medium comprising a portable storage medium.

8. The computing device of claim 2, further configured to:
   store, on the storage medium, another directory entry specifying information concerning other data in the directory of the file system, wherein the another directory entry comprises a flag that indicates that the other data is stored in one or more clusters of the storage medium that are not contiguous;
   obtain a request to delete the other data;
   determine from the flag in the another directory entry that the other data is not stored in contiguous clusters;
   identify the one or more non-contiguous clusters in which the other data is stored by traversing entries of the file allocation table corresponding to each of the one or more non-contiguous clusters; and
   update the entries of the allocation bitmap corresponding to each of the identified one or more non-contiguous clusters to indicate that each cluster is available for storage.

9. The computing device of claim 2, the computing device configured to update the corresponding entries of the allocation bitmap by clearing the entries.

10. The computing device of claim 2, the computing device configured to identify the contiguous clusters of the chain based further on a size of each cluster.

11. The computing device of claim 2, the flag comprising a single bit.

12. The computing device of claim 2, the storage medium comprising a portable storage medium.

* * * * *